(12) United States Patent
Ur et al.

(10) Patent No.: US 9,858,811 B2
(45) Date of Patent: Jan. 2, 2018

(54) VEHICLE TRAFFIC MANAGEMENT

(71) Applicant: Empire Technology Development LLC, Wilmington, DE (US)

(72) Inventors: Shmuel Ur, Galil (IL); Ariel Fligler, Hod-Hasharon (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 30 days.

(21) Appl. No.: 14/518,144

(22) Filed: Oct. 20, 2014

(65) Prior Publication Data

US 2016/0110997 A1 Apr. 21, 2016

(51) Int. Cl.
*G08G 1/00* (2006.01)
*G08G 1/14* (2006.01)
*G01C 21/34* (2006.01)

(52) U.S. Cl.
CPC ............ *G08G 1/00* (2013.01); *G01C 21/3492* (2013.01); *G08G 1/143* (2013.01); *G08G 1/147* (2013.01)

(58) Field of Classification Search
CPC .................................................. G01C 21/3476
USPC ........................................................... 701/22
See application file for complete search history.

(56) References Cited

U.S. PATENT DOCUMENTS

| | | | |
|---|---|---|---|
| 8,352,111 B2 | 1/2013 | Mudalige | |
| 8,571,722 B2 | 10/2013 | Samples et al. | |
| 2011/0004507 A1 | 1/2011 | Potkonjak | |
| 2013/0046457 A1* | 2/2013 | Pettersson | G01C 21/3469 701/117 |
| 2013/0162829 A1 | 6/2013 | Kadowaki et al. | |
| 2015/0006005 A1* | 1/2015 | Yu | G05D 1/0297 701/22 |
| 2015/0219464 A1* | 8/2015 | Beaurepaire | G01C 21/3617 701/538 |

FOREIGN PATENT DOCUMENTS

| | | |
|---|---|---|
| CN | 103303153 A | 9/2013 |
| EP | 2557020 A2 | 2/2013 |
| JP | 2009176187 A | 8/2009 |
| JP | 2010018167 A | 1/2010 |
| JP | 2014004904 A | 1/2014 |
| KR | 1019980004235 A | 3/1998 |
| KR | 20090041087 A | 4/2009 |
| KR | 1020130056732 A | 5/2013 |
| WO | 2009131922 A1 | 10/2009 |

(Continued)

OTHER PUBLICATIONS

"Autonomous Technology," accessed at http://blog.a9t9.com/2014/self-driving-car-that-you-can-buy.html, posted on Feb. 9, 2014, pp. 1-5.

(Continued)

*Primary Examiner* — Redhwan K Mawari
*Assistant Examiner* — Anshul Sood
(74) *Attorney, Agent, or Firm* — Brundidge & Stanger, P.C.

(57) ABSTRACT

In some examples, reducing traffic includes locating an available remote location within a predetermined distance of the particular destination, socializing an identity of the remote location, and minimizing traffic disruptions at the available remote location for a predetermined amount of time.

23 Claims, 5 Drawing Sheets

(56) References Cited

FOREIGN PATENT DOCUMENTS

WO 2013050194 A1 4/2013

OTHER PUBLICATIONS

"Volvo can self-park using a phone—with no driver behind the wheel," accessed at http://www.news.com.au/finance/business/volvo-can-selfpark-using-a-phone-with-no-driver-behind-the-wheel/story-fnda1bsz-1226667047195, posted on Jun. 20, 2013, pp. 1-10.

"Volvo Car Group demonstrates the ingenious self-parking car," accessed at http://webcache.googleusercontent.com/search?q=cache:A--GWMWCI00J:www.volvocars.com/intl/top/corporate/volvo-sustainability/pages/sustainability-news.aspx%3Fitemid%3D401+&cd=1&hl=en&ct=clnk&gl=in, posted on Jun. 20, 2013, p. 1.

Alvina, M., et al., "A Proposal for Self-Driving Taxis," MGNT-5650 "Management of Technology and Innovation", pp. 1-19 (Aug. 5, 2013).

Li, S., "Multi-Attribute Taxi Logistics Optimization," Master of Science in Engineering and Management, Massachusetts Institute of Technology, pp. 1-103 (Jun. 2006).

Litman, T., "Autonomous Vehicle Implementation Predictions Implications for Transport Planning," Victoria Transport Policy Institute, pp. 1-19 (Dec. 23, 2013).

McGlaun, S., "Ford Shows Off Self Parking Car Technology with Remote Control Option," accessed at http://web.archive.org/web/20140811105948/http://www.dailytech.com/Ford+Shows+Off+Self+Parking+Car+Technology+with+Remote+Control+Option/article33516.htm, posted on Oct. 8, 2013, pp. 1-2.

* cited by examiner

VEHICLE TRAFFIC MANAGEMENT

TECHNICAL FIELD

The described technology pertains generally to vehicle traffic management within a defined area.

BACKGROUND

Unless otherwise indicated herein, the approaches described in this section are not prior art to the claims in this application and are not admitted to be prior art by inclusion in this section.

The search for temporary parking has long been a source of frustration and a test of patience for drivers. For example, while waiting for arriving passengers at an airport, drivers may be prohibited by law enforcement officials from parking even temporarily in a passenger pick-up zone. Thus, these drivers often resort to driving laps around the airport until their respective arriving passengers emerge from the airport terminal. As an accommodation for such drivers, some airport authorities have established short term parking lots, often called "cell phone lots," or the like. However, the supply of such short term parking often exceeds the demand; and short term parking lots are both scarce and impractical in most other settings.

SUMMARY

In one example embodiment, a non-transitory computer-readable medium may store executable instructions that, when executed, cause one or more processors to: monitor traffic volume within a threshold distance of a destination at which arrival is intended at a predetermined time; identify a road, within the threshold distance of the destination, on which a traffic volume is less than a threshold level; navigate to the identified road; stop at an intermediary point on the identified road until a condition is met; and in response to the condition being met, navigate to another intermediary point or to the destination.

In another example embodiment, a navigation system for an automated vehicle includes: a traffic data interface configured to receive, at regular time intervals, traffic information within a predetermined radius of a final destination; a traffic detector configured to detect vehicles adjacent to the automated vehicle; and a navigator configured to: identify a temporary stopping point within the predetermined radius of the final destination based on the traffic information, navigate to the identified temporary stopping point, and navigate away from the identified temporary stopping point in response to a condition being met.

In yet another embodiment, a method to reduce traffic includes locating an available remote location within a predetermined distance of the particular destination, socializing an identity of the remote location, and minimizing traffic disruptions at the available remote location.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Embodiments described and implied herein may provide guidance for a vehicle to linger or wait within a defined threshold vicinity of an intended destination in a manner that reduces resource consumption and reduces disruptions to surrounding traffic. The guidance may be provided to an automated vehicle in the form of executable driving instructions or to a navigation technology device in or associated with an automated vehicle in the form of navigational instructions. Non-limiting examples of a navigation technology may include a global positioning system (GPS) or global navigation satellite system (GNSS), which may also be referred to as Galileo. Further still, at least portions of the guidance may be socialized via a social media website or application.

As referenced herein, an automated or, interchangeably, self-driving vehicle may refer to an autonomous vehicle that is capable of sensing its environment and driving without driver intervention. That is, while an automated vehicle may be configured to hold passengers, driver intervention is not needed to travel from one location to another.

The embodiments and implementations of social vehicle traffic management, as described herein, may be implemented in various contexts. Solely for the purpose of explanation, the present description references embodiments and scenarios in which a vehicle is scheduled to arrive at or return to a particular destination at a particular time. For example, a passenger of an automated vehicle may instruct the automated vehicle to return to a particular destination one hour after being dropped off there. Thus, in accordance with some embodiments and implementations described herein, the automated vehicle may be provided with executable driving or navigational instructions that allows the automated vehicle to spend the intervening one hour in an efficient manner, e.g., to remain in a threshold vicinity of the particular destination, to not use excessive energy resources, and to not interfere with traffic. As another example, a driver of a vehicle may be instructed or requested to pick up a passenger from the particular destination at a scheduled time. Therefore, in accordance with other embodiments and implementations described herein, the driver may be provided with, via a client device, navigational guidance that allows the driver to operate or drive the vehicle leading up to the scheduled time in the aforementioned efficient manner. Accordingly, a service provider may facilitate at least portions of social vehicle traffic management by monitoring traffic volume within a threshold distance of the particular destination; identify a road, within the defined threshold vicinity of the particular destination, on which traffic volume is less than a threshold level; navigate a vehicle utilizing the social vehicle traffic management service to the identified road; stop the vehicle at an intermediary point on the identified road until a condition is met; and in response to the condition being met, navigate the vehicle to another intermediary point within the threshold distance of the particular destination or to the particular destination itself.

In addition or alternatively, the service provider may facilitate at least portions of social vehicle traffic management by monitoring traffic and/or road conditions within a threshold distance of the particular destination; identify a road, within the defined threshold vicinity of the particular destination, on which the traffic and/or road conditions are conducive to waiting vehicles; navigate a vehicle utilizing the social vehicle traffic management service to the identified road; stop the vehicle at an intermediary point on the identified road until a condition is met; and in response to the condition being met, navigate the vehicle to another intermediary point within the threshold distance of the particular destination or to the particular destination itself. Non-limiting examples of traffic and/or road conditions that may be conducive to waiting vehicles may include a two-lane road (as opposed to one-lane in a particular direction) so as to allow other vehicles to pass a waiting vehicle legally and safely, and zoning (roads in a residential zone may not be conducive to waiting vehicles, while roads in a commercial zone may be more tolerant of light traffic build-up).

The service provider may be remotely located relative to the vehicle or, alternatively, may be implemented by a device located in or on the vehicle.

Further to the above examples, the navigational instructions provided to the automated vehicle and the navigational guidance provided to the driver may also be socialized. That is, social media networks such as Waze® and Twitter® may serve as a medium to inform other automated vehicles or other drivers of locations, within the defined threshold vicinity of the particular destination, at which vehicles may wait or idle in a manner that is not disruptive to surrounding traffic. Accordingly, the service provider may facilitate other portions of social vehicle traffic management, on behalf of one or more vehicles, by locating an available remote location within the defined vicinity of location X; socializing an identity of the available remote location; and minimizing traffic disruptions at the remote location. As set forth above, the service provider may be remotely located relative to the vehicle or, alternatively, may be implemented by a device located in or on the vehicle.

Figure 1:
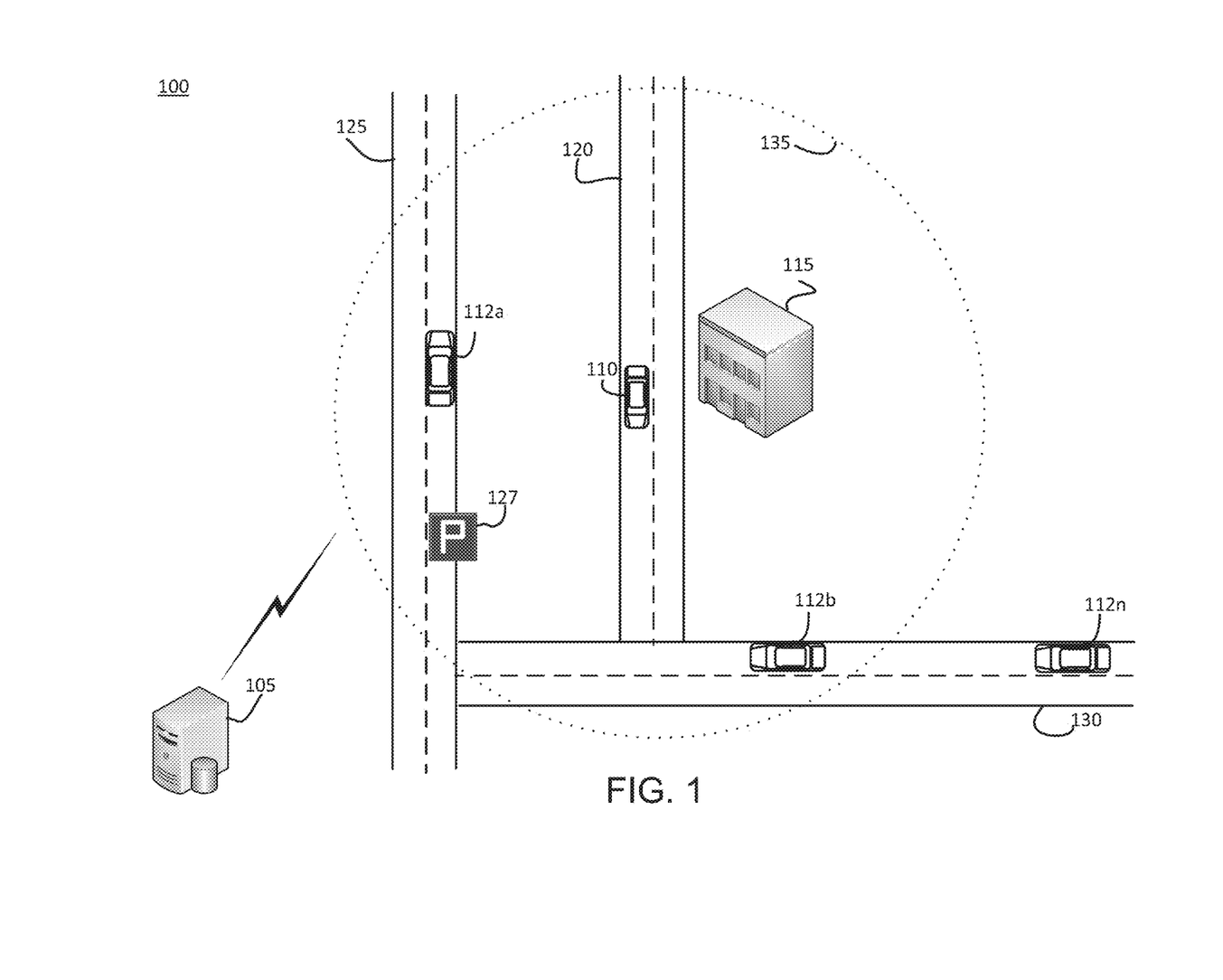
FIG. 1 shows an overview of an environment in which vehicle traffic management may be implemented, arranged in accordance with at least some embodiments described herein.

FIG. 1 shows an overview of an environment 100 in which vehicle traffic management, in accordance with at least some embodiments described herein, may be implemented. Environment 100 may include service provider 105; vehicle 110; destination 115; roads 120, 125, and 130; waiting area 127; and threshold distance boundary 135.

Service provider 105 may refer to an entity, having an online presence via a website and/or client-based application, configured to provide navigational information and guidance to users or subscribers of a corresponding service. Service provider 105 may be an online social media site or application, examples of which may include, but not be limited to, e.g., Waze®, Twitter®, etc. As a social network service provider, service provider 105 may implement bi-directional communications with one or more of vehicles 110, 112a, 112b, . . . , 112n or client devices located in one or more of vehicles 110, 112a, 112b, . . . , 112n. Such bi-directional communications may be implemented using any available wireless communications protocols including, but not limited to, CDMA (Code Division Multiple Access)-2000, W-CDMA (W-Code Division Multiple Access), Wibro (Wireless Broadband Internet), GSM (Global System for Mobile communications), and IMT (International Mobile Telecommunication)-2000 protocols.

Vehicle 110, in accordance with some embodiments described herein, may refer to an autonomous or self-driving vehicle. As such, vehicle 110 may be configured, designed, and/or programmed to drive without human operation intervention. Vehicle 110 may drive responsive to navigational information provided by service provider 105, as well as to environmental data gathered by self-contained or self-attached radar, sonar, computer vision, navigation technology, etc., technologies and/or environmental data provided by service provider 105.

Vehicle 110 may additionally or alternatively refer to a driver-operated vehicle having a corresponding client device located therein that may be communicatively connected to service provider 105. In this regard, the client device may be implemented as a small-form factor portable (or mobile) electronic device such as a smartphone, a navigation technology device, a wireless web-watch device, a personal headset device, an application specific device, a laptop computer, a tablet computer, or a hybrid device that provides the functionality of any of the above listed devices. Further, the client device corresponding to vehicle 110 may be built in to the vehicle or may be removably located in vehicle 110. As described herein, a reference to communications by or with a driver-operated embodiment of vehicle 110 may be understood to refer to a client device corresponding to the vehicle.

Vehicles 112a, 112b, . . . , and 112n may respectively be similarly configured as any of the above embodiments of vehicle 110. Vehicles 112a, 112b, . . . , and 112n may refer to vehicles that are located at various points along roads 120, 125, and/or 130 within threshold distance boundary 135. Further, unless context otherwise requires, reference may be made to plural vehicles 112 or reference may be made to a single vehicle 112. Further still, embodiments of social vehicle traffic management, as described herein, are not limited to three (3) representations of vehicle 112.

Destination 115 may refer to any geographic location at which, according to embodiments described herein, vehicle 110 is intended to arrive by a particular time. Further, destination 115 may serve as a focal point from which a dynamic radial distance may be used to establish a circumferential boundary within which vehicle 110 is intended to wait until the particular time at which vehicle 110 is scheduled to be at destination 115.

Road 120 may refer to a road, street, or thoroughfare on or near which destination 115 is located and on which any one or more of vehicle 110 and vehicles 112 may be driven. Since destination 115 is located on or near road 120, at least a portion of road 120 lies within threshold distance boundary 135.

Roads 125 and 130 may respectively refer to a road, street, or thoroughfare, portions of which may lie within threshold distance boundary 135. Any one or more of vehicle 110 and vehicles 112 may be driven on roads 125 and 130 respectively.

Waiting area 127 may refer to one or more areas on or alongside any one of roads 120, 125, and 130 on which at least vehicle 110 may intentionally wait, e.g., idle in neutral, stop, or park, for a period of time extending beyond what may be expected for a legal traffic stop. Waiting area 127 may be a legal side-street parking space; a parking lot for which an entrance is located on one of roads 120, 125, and/or 130; or a portion of any one of roads 120, 125, or 130 at which a light traffic volume is conducive for at least vehicle 110 to wait as described above. With regard to the latter, waiting area 127 may located in a traffic lane at which, under certain traffic conditions, a stopped vehicle 110 may be cited for double parking.

Threshold distance boundary 135 may refer to an approximate circumferential boundary, the dynamic radial distance of which may stem from destination 115. In accordance with embodiments described herein, it is within threshold distance boundary 135 that vehicle 110 may be intended to wait until a scheduled arrival time at destination 115. The dynamic radial distance may be established by service provider 105 as a default distance, e.g., one mile; may be selected from a menu of choices, e.g., one mile, two miles, five miles; or may be customized by an operator of vehicle 110 to another value, e.g., a distance to an intermittent stopping point. Additionally or alternatively, the dynamic radial distance by which threshold distance boundary 135 is established may be determined in accordance with a range of communications connectivity that vehicle 110 may maintain with service provider 105, relative to destination 115. Thus, threshold distance boundary 135 may not be symmetrical in every direction, in some instances, but rather asymmetrical based on natural and/or manufactured topography.

Figure 2:
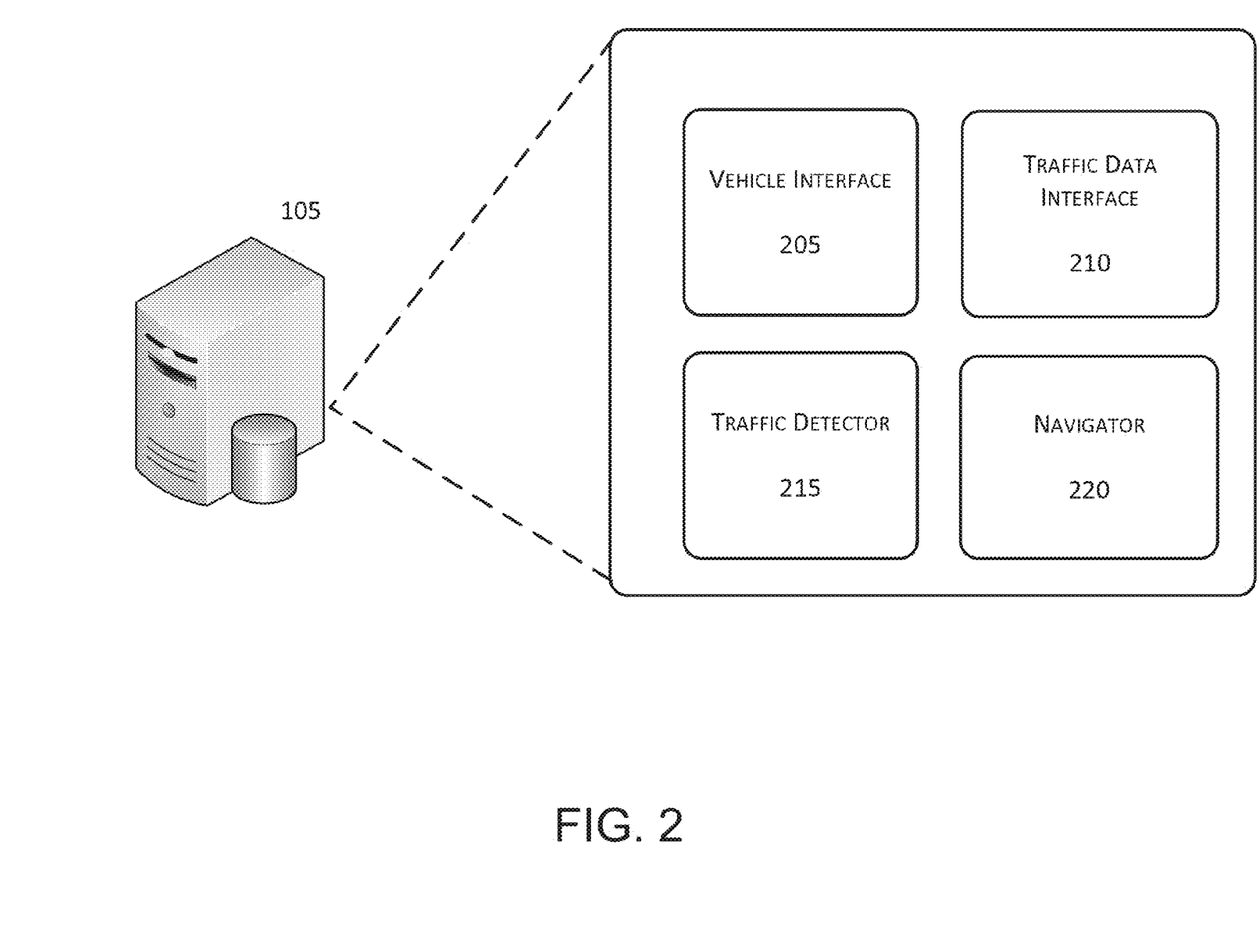
FIG. 2 shows an example configuration of a service provider by which at least portions of vehicle traffic management may be implemented, arranged in accordance with at least some embodiments described herein.

FIG. 2 shows an example configuration of service provider 105 by which at least portions of vehicle traffic management may be implemented, arranged in accordance with at least some embodiments described herein. As depicted, service provider 105 may include various components such as vehicle interface 205, traffic data interface 210, traffic detector 215, and navigator 220. Although illustrated as discrete components, various components of service provider 105 may be divided into additional components, combined into fewer components, or eliminated altogether while being contemplated within the scope of the disclosed subject matter. It will be understood that each function and/or operation of the components may be implemented, individually and/or collectively, by a wide range of hardware, software, firmware, or any combination thereof. In that regard, one or more of vehicle interface 205, traffic data interface 210, traffic detector 215, and navigator 220 may be included in a program or application hosted and executable on a server that is associated with service provider 105. Alternatively, one or more of vehicle interface 205, traffic data interface 210, traffic detector 215, and navigator 220 may be included in a program or application hosted and executable on vehicle 110 or a client device operated by a driver or occupant of vehicle 110.

Vehicle interface 205 may refer to a component or module that is configured, programmed, and/or designed to implement bi-directional communications with vehicle 110. As long as service provider 105 is communicatively connected to vehicle 110, service provider 105 may be informed of a location of vehicle 110 at any time.

Vehicle interface 205 may receive, from vehicle 110, an identifier or location of destination 115. The identifier or location of destination 115 may be received in the form of an address, navigational coordinates, or landmark name. In accordance with some embodiments, vehicle interface 205 may also receive, from vehicle 110, a particular time at which vehicle 110 is scheduled to arrive at or return to destination 115. Vehicle interface 205 may still further receive, from vehicle 110, a customized radial distance stemming from destination 115 that may be used to establish threshold distance boundary 135. Otherwise, a default radial distance previously configured, programmed, or designed by service provider 105 may be used for that purpose.

Vehicle interface 205 may further provide or transmit, to vehicle 110, information regarding traffic and an identification of parking area 127, within threshold distance boundary 135, to vehicle 110.

Traffic data interface 210 may refer to a component or module that is configured, programmed, and/or designed to receive, at regular time intervals, information regarding traffic within threshold distance boundary 135 for vehicle 110. The traffic information may be received from one or more of multiple sources including, but not limited to a navigational satellite; a traffic monitoring services; an internet service provider or the like, e.g., Google®, Yahoo®, etc.; and/or a social media site, e.g., Waze®, Twitter®, Facebook®, etc.

Traffic data interface 210 may be implemented by hardware, software, firmware, or any combination thereof, to serve as a communications interface relative to multiple sources.

Traffic detector 215 may refer to a component or module that is configured, programmed, and/or designed to receive information or data regarding vehicles adjacent or near to vehicle 110. In some embodiments, traffic detector 215 may receive navigation data that indicates or identifies any of vehicles 112 that may be adjacent or near to vehicle 110. Thus, traffic detector 215 may be communicatively connected to at least one navigational satellite. Further, traffic detector 205 may receive radar, sonar, video, etc., data that indicates the presence of any of vehicles 112 that may be adjacent or near to vehicle 112. Thus, traffic detector 215 may also be communicatively connected to one or more radar, sonar, video, etc., capturing devices disposed on or near vehicle 110. For example, a self-contained or self-attached device associated with vehicle 110 may have radar, sonar, video, etc., capturing capabilities. Alternatively, radar, sonar, video, etc., capturing devices may be disposed at various locations along side roads 120, 125, and 130 on, for example, traffic poles, utility poles, building rooftops, etc.

Navigator 220 may refer to a component or module that may be configured, programmed, and/or designed to identify an available waiting area for vehicle 10 within threshold distance boundary 135 based at least on the traffic information received by traffic data interface 210, navigate vehicle 110 to the available waiting area, and navigate vehicle 110 away from the waiting area responsive to a traffic condition at or near the waiting area being met.

Navigator 220 may be provided, by vehicle interface 205, the identifier of destination 115; and navigator 220 may also be provided, from traffic detector 210 or from vehicle 110, the traffic information or data regarding vehicles adjacent to or near vehicle 110. Such information or data may be provided to navigator 220 at regular time intervals, e.g., 10 seconds. Navigator 220 may then implement known real-time motion detection algorithms to monitor traffic and/or or implement known data streaming analysis algorithms to analyze traffic to identify an embodiment of waiting area 127 on roads 120, 125, and 130. In accordance with the embodiments described herein, waiting area 127 may be deemed available when traffic there is less than a threshold value and, therefore, conducive for vehicle 110 to wait, e.g., temporarily idle, stop, or park. Examples of the threshold value may be less than three vehicles 112 being located within 50 feet of waiting area 127. Navigator 220 may then provide vehicle 110 with navigational instructions or guidance towards waiting area 127.

As waiting area 127 is identified as being available, traffic data interface 210 may provide such information to a social media site, e.g., Waze®, Twitter®, Facebook®, etc. Accordingly, other automated vehicles within threshold distance boundary 135 may also be directed to waiting area 127 or, alternatively, drivers or operators of other vehicles within threshold distance boundary 135 may be advised of the availability of waiting area 127 as a temporary stopping point.

When the information provided by traffic detector 215 indicates that traffic adjacent to or near vehicle 110 exceeds a threshold level, e.g., three vehicles 112 located within 50 feet, service provider 105 may manage traffic at or near waiting area 127. For example, traffic data interface 210 may provide information to the aforementioned social media site to inform other vehicles or users that traffic at or near waiting area 127 is such that additional vehicles 112 should not stop there, even temporarily. Thus, in some embodiments, traffic data interface 210 may provide instructions, via the social media site, for the last arriving one of vehicles 112 to depart from waiting area 127. As another example, navigator 220 may provide vehicle 110 with navigational instructions or guidance to direct vehicle 110 away from waiting area 127. The navigational instructions or guidance may be intended to navigate vehicle 110 towards another available waiting area 127 or to any one of roads 120, 125, and 130 within threshold distance boundary 135 until another available waiting area 127 is identified.

Thus, both singularly and in combination with social media, service provider 105 may assist vehicle 110 to efficiently linger or wait in a defined proximity relative to destination 115 in a manner that is both time efficient and energy efficient.

Figure 3:
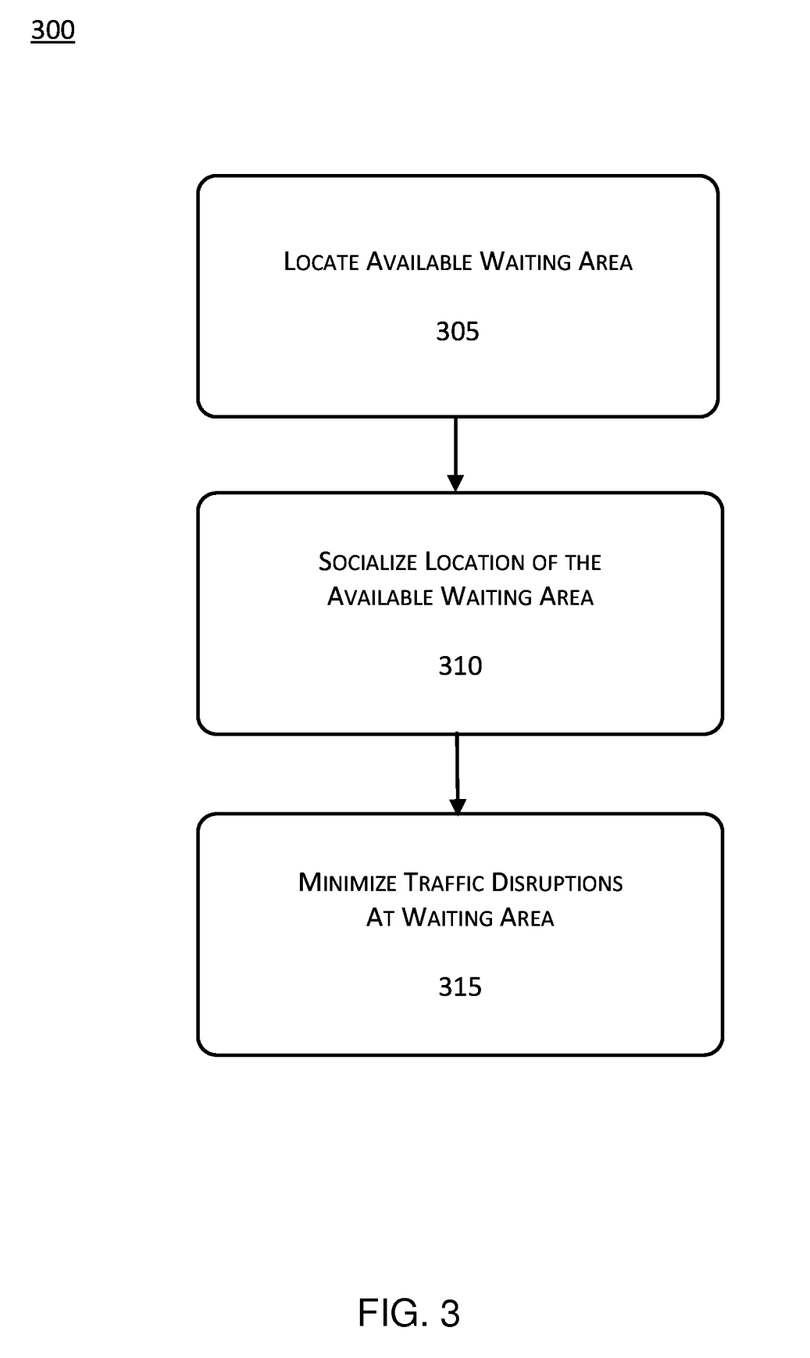
FIG. 3 shows an example processing flow by which vehicle traffic management may be implemented, arranged in accordance with at least some embodiments described herein.

FIG. 3 shows an example processing flow 300 by which vehicle traffic management may be implemented, arranged in accordance with at least some embodiments described herein. The operations of processing flow 300 may be implemented by service provider 105, as illustrated in FIGS. 1 and 2. Processing flow 300 may include one or more operations, actions, or functions as illustrated by one or more blocks 305, 310, and/or 315. Although illustrated as discrete blocks, various blocks may be divided into additional blocks, combined into fewer blocks, or eliminated, depending on the desired implementation. Processing flow 300 may begin at block 305.

Block 305 (Locate Available Waiting Area) may refer to navigator 220 of service provider 105 identifying available waiting area 127 for vehicle 10 within threshold distance boundary 135 relative to destination 115 based at least on the traffic information received by traffic data interface 210. Navigator 220 may be provided the identifier or location of destination 115 by vehicle interface 205 and, additionally or alternatively, navigator 220 may be provided traffic information regarding vehicles adjacent to or near vehicle 110 from either traffic detector 215 or vehicle 110. Navigator 220 may then identify available waiting area 127 on roads 120, 125, and 130 by implementing a real-time motion detection algorithm or a data streaming analysis algorithm to monitor and analyze traffic within the threshold distance boundary 135. In accordance with the embodiments described herein, waiting area 127 may be deemed available when traffic there is less than a threshold value and, therefore, conducive for vehicle 110 to wait, e.g., temporarily idle, stop, or park. Navigator 220 may then provide vehicle 110 with navigational instructions or guidance towards waiting area 127. Block 305 may be followed by block 310.

Block 310 (Socialize Location of the Available Waiting Area) may refer to traffic data interface 210 providing the location of available waiting area 127 to a social media site, e.g., Waze®, Twitter®, Facebook®, etc. Accordingly, other automated vehicles within threshold distance boundary 135 may also be directed to waiting area 127; additionally or alternatively, drivers or operators of other vehicles within threshold distance boundary 135 may be advised of the availability of waiting area 127 as a waiting area. Block 310 may be followed by block 315.

Block 315 (Minimize Traffic Disruptions at Waiting Area) may refer to service provider managing traffic at or near waiting area 127.

For example, traffic data interface 210 may provide information to the aforementioned social media site to inform other vehicles or users that traffic at or near waiting area 127 is no longer conducive to additional vehicles 112 stopping, even temporarily. Thus, in some embodiments, traffic data interface may provide instructions, via the social media site, for the last arriving one of vehicles 112 to depart from waiting area 127. In other embodiments, navigator 220 may provide vehicle 110 with navigational instructions or guidance to direct vehicle 110 away from waiting area 127. The navigational instructions or guidance may be intended to navigate vehicle 110 towards another available waiting area 127 or to any one of roads 120, 125, and 130 within threshold distance boundary 135 until another available waiting area 127 is identified.

Thus, both singularly and in combination with social media, service provider 105 may assist vehicle 110 to efficiently wait within threshold distance boundary 135 relative to destination 115 in a manner that is both time efficient and energy efficient.

Figure 4:
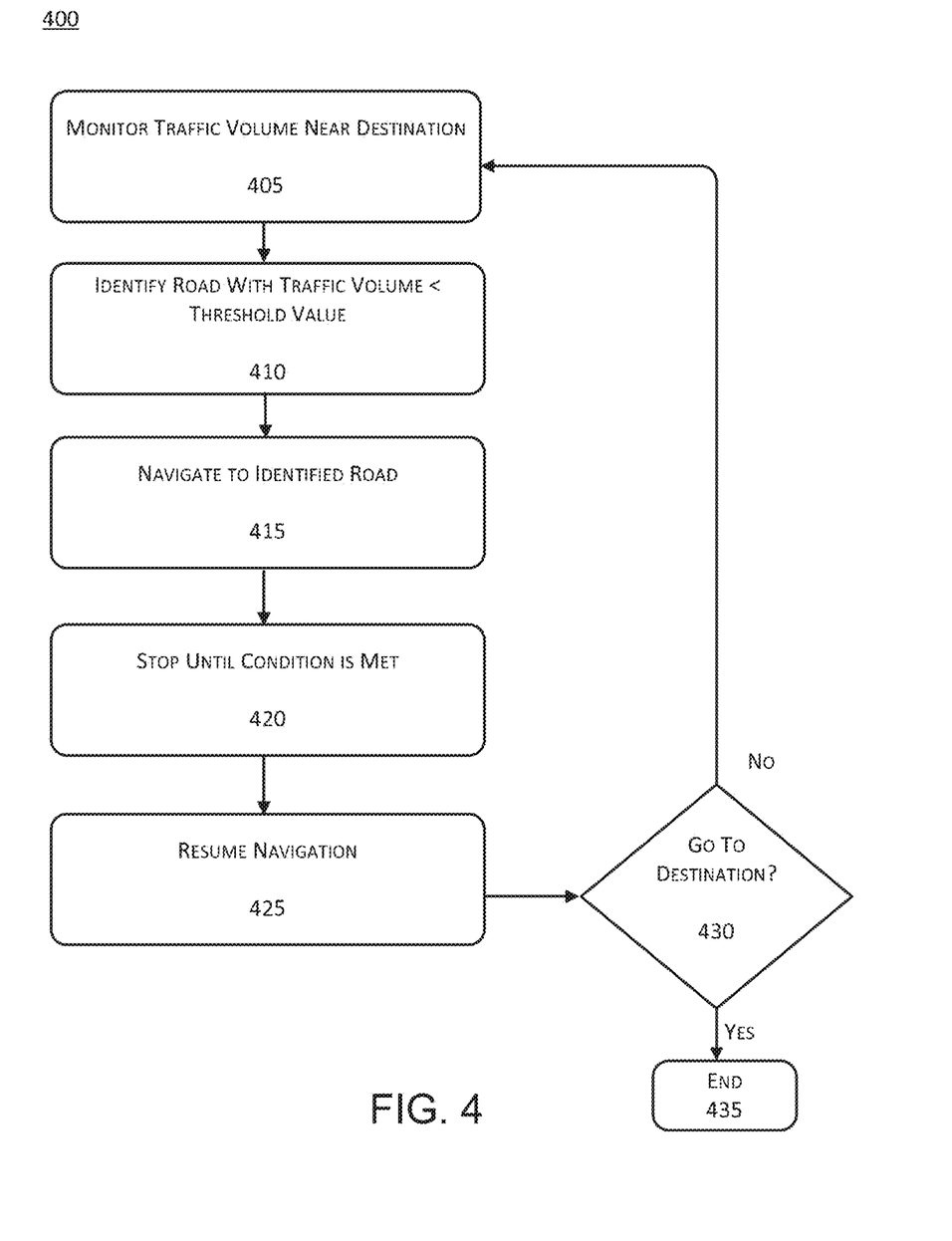
FIG. 4 shows a further example processing flow by which vehicle traffic management may be implemented, arranged in accordance with at least some embodiments described herein.

FIG. 4 shows another example processing flow 400 by which vehicle traffic management may be implemented, arranged in accordance with at least some embodiments described herein. The operations of processing flow 400 may be implemented by service provider 105, as illustrated in FIGS. 1 and 2. Processing flow 400 may include one or more operations, actions, or functions as illustrated by one or more blocks 405, 410, 415, 420, 425, 430, and/or 435.

Although illustrated as discrete blocks, various blocks may be divided into additional blocks, combined into fewer blocks, or eliminated, depending on the desired implementation. Processing flow 400 may begin at block 405.

Block 405 (Monitor Traffic Near Destination) may refer to vehicle service provider 105 monitoring traffic on roads 120, 125, and 130 within threshold distance boundary 135 relative to destination 115. The operation may begin when vehicle interface 205 receives, from vehicle 110, an identifier or location of destination 115. The identifier or location of destination 115 may be received in the form of an address, navigational coordinates, or landmark name. Vehicle interface 205 may also receive, from vehicle 110, a particular time at which vehicle 110 is scheduled to arrive or return to destination 115. Vehicle interface 205 may still further receive, from vehicle 110, a customized radial distance stemming from destination 115 that may be used to establish threshold distance boundary 135. Otherwise, a default radial distance previously configured, programmed, or designed by service provider 105 may be used for that purpose. The operation may further include traffic data interface 210 receiving, at regular time intervals, information regarding traffic within threshold distance boundary 135. The traffic information may be received from one or more of multiple sources including, but not limited to a navigational satellite, a traffic monitoring services, an internet service provider, and/or a social media site. The operation may still further include traffic detector 215 receiving information or data regarding vehicles adjacent to or near vehicle 110. In that regard, traffic detector 215 may receive navigational data that indicates or identifies any of vehicles 112 that may be adjacent to or near vehicle 110. Additionally or alternatively, traffic detector 205 may receive radar, sonar, video, etc., data that indicates the presence of any of vehicles 112 that may be adjacent to or near vehicle 112. Block 405 may be followed by block 410.

Block 410 (Identify Road with Traffic Volume<Threshold Value) may refer to navigator 220 identifying which of roads 120, 125, and 130 includes available waiting area 127 for vehicle 110 within threshold distance boundary 135, based at least on the traffic information received by traffic data interface 210. The operation may include navigator 220 being provided the identifier or location of destination 115 by vehicle interface 205, and the traffic information and/or data regarding vehicles adjacent to vehicle 110 from either traffic detector 215 or vehicle 110. The operation may also include navigator 220 executing a real-time motion detection algorithm or a data streaming analysis algorithm to monitor and analyze traffic to thereby identify an available waiting area 127 on one or more of roads 120, 125, and 130. In accordance with the embodiments described herein, waiting area 127 may be deemed available when traffic there is less than a threshold value and, therefore, conducive for vehicle 110 to wait, e.g., temporarily idle, stop, or park. Block 410 may be followed by block 415.

Block 415 (Navigate to Identified Road) may refer to navigator 220 providing vehicle 110 with navigational instructions or guidance towards available waiting area 127.

Further, block 415 may optionally include traffic data interface 210 socializing the location of available waiting area 127 to a social media site. Accordingly, other automated vehicles within threshold distance boundary 135 may also be directed to waiting area 127 by service provider 105. Additionally or alternatively, drivers or operators of other vehicles within threshold distance boundary 135 may be advised of the availability of waiting area 127 as a waiting area, by service provider 105.

Block 420 (Stop Until Condition is Met) may refer to vehicle 110 idling, stopping, or parking at waiting area 127, upon receiving instructions to do so from service provider 105. Waiting area 127 may refer to one or more areas on or alongside any one of roads 120, 125, and 135 on which at least vehicle 110 may temporarily idle, e.g., in neutral, stop, or park for a period of time extending beyond what may be expected for a legal traffic stop. Waiting area 127 may be a legal side-street parking space, a parking lot, or a portion of one of roads 120, 125, or 130 at which a light traffic volume is conducive for at least vehicle 110 to temporarily stop. In that regard, waiting area 127 may located in a traffic lane at which, under certain traffic conditions, a stopped vehicle 110 may be cited for double parking.

Block 425 (Resume Navigation) may refer to navigator 220 providing vehicle 110 with navigational instructions or guidance to depart waiting area 127. The operation may include service provider 105 managing traffic at or near waiting area 127. When the information provided by traffic detector 215 indicates that traffic adjacent to or near vehicle 110 exceeds a threshold level, e.g., three vehicles 112 located within 50 feet, navigator 220 may provide vehicle 110 with navigational instructions or guidance to direct vehicle 110 away from waiting area 127 towards another available waiting area 127 or to any one of roads 120, 125, and 130 within threshold distance boundary 135 until another available waiting area 127 is identified. In other embodiments, service provider 105 may act to manage traffic at or near waiting area 127 by having traffic data interface 210 provide information to the aforementioned social media site to report that traffic at or near waiting area 127 is no longer conducive to any more of vehicles 112 waiting. Thus, in some embodiments, traffic data interface may provide instructions, via the social media site, for the last arriving one of vehicles 112 to depart from waiting area 127. Block 425 may be followed by block 430.

Decision block 430 (Go to Destination?) may refer to navigator 220 determining whether the current time is appropriate for vehicle 110 to return to or arrive at destination 115.

A "no" decision at decision block 430 may refer to navigator 220 determining that the scheduled time for vehicle 110 to return to or arrive at destination 115 is not yet near, and therefore navigator 220 may determine that vehicle 110 is to continue to wait or continue to drive on any of roads 120, 125, or 130 within threshold distance boundary 135. A "no" decision may be followed by a return to block 405.

A "yes" decision at decision block 430 may refer to navigator 220 determining that the scheduled time for vehicle 110 to return to or arrive at destination 115 is near, e.g., within a predetermined threshold of five (5) minutes of the scheduled time. Therefore, navigator 220 may provide navigational instructions or guidance intended to navigate vehicle 110 towards destination 115. A "yes" decision may be followed by block 435.

Block 435 (End) may refer to vehicle 110 arriving at destination 115, and vehicle 110 providing a message to that effect to service provider 105.

The embodiment shown in FIG. 4 and described above is in no way limiting, and is provided only for descriptive purposes.

Figure 5:
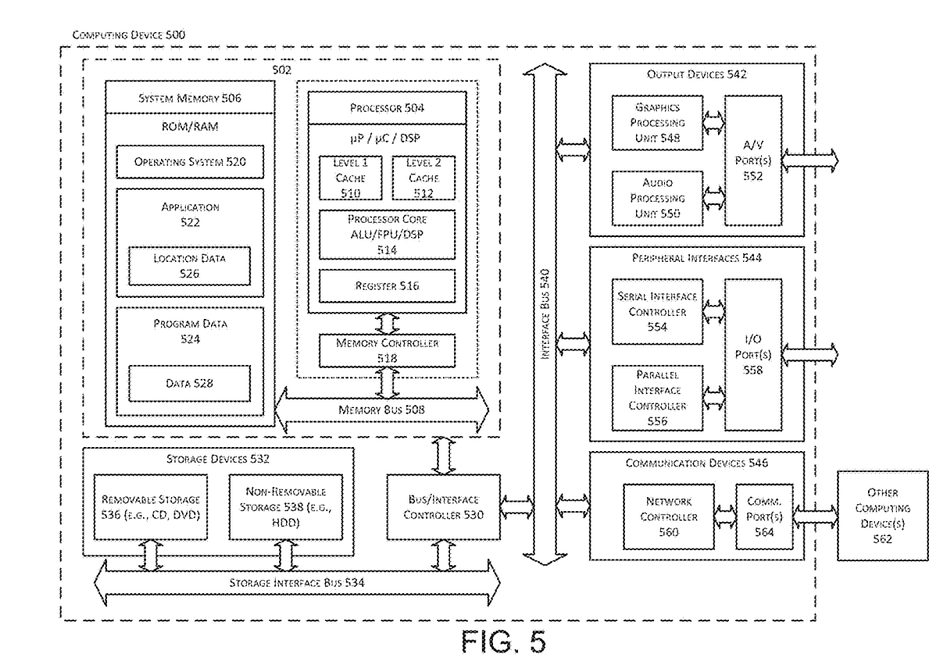
FIG. 5 shows a block diagram illustrating an example computing device by which various example solutions described herein may be implemented, arranged in accordance with at least some embodiments described herein.

FIG. 5 shows a block diagram illustrating an example computing device 500 by which various example solutions described herein may be implemented, arranged in accordance with at least some embodiments described herein.

In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (μP), a microcontroller (μC), a digital signal processor (DSP), or any combination thereof. Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include location data 526 that is arranged to enable execution of the functions as described herein including those described with respect to processing flow 300 of FIG. 3 and processing flow 400 by service provider 105. Program data 524 may include interface data 528 that may be useful service provider to interface with vehicles 110 and 112, as well as navigational satellites, social networking services, etc. In some embodiments, application 522 may be arranged to operate with program data 524 on operating system 520 such that implementations of social vehicle traffic management may be implemented as described herein. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RE), microwave, infrared (IR) and other wireless media. The term computer readable media as used herein may include both storage media and communication media.

Computing device 500 may be implemented as a portion of a small-form factor portable (or mobile) electronic device such as a cell phone, a smartphone, a personal data assistant (PDA), a personal media player device, a wireless webwatch device, a personal headset device, an application specific device, or a hybrid device that include any of the above functions. Computing device 500 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for device configuration 300 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A non-transitory computer-readable medium that stores instructions that, when executed by an automated vehicle comprising one or more processors, cause the one or more processors to execute vehicle-directing instructions that comprise:
   monitor traffic volume within a threshold distance of a destination at which arrival is intended at a predetermined time;
   identify a road, within the threshold distance of the destination, on which a traffic volume is less than a threshold level;
   navigate the automated vehicle to the identified road;
   stop the automated vehicle at an intermediary point on the identified road until a traffic condition is met between the intermediary point and the destination; and
   responsive to the traffic condition being met, navigate the automated vehicle towards the destination.

2. The non-transitory computer-readable medium of claim 1, wherein the intermediary point is in a traffic lane on the identified road.

3. The non-transitory computer-readable medium of claim 1, wherein the non-transitory computer-readable medium is executable on a navigation technology device.

4. The non-transitory computer-readable medium of claim 1, wherein the vehicle-directing instructions to identify the road comprises vehicle-directing instructions to receive traffic information via a social driving network.

5. The non-transitory computer-readable medium of claim 1, wherein the vehicle-directing instructions to identify the road comprises vehicle-directing instructions to exchange traffic information with other automated vehicles located within the threshold distance of the destination.

6. The non-transitory computer-readable medium of claim 1, wherein the vehicle-directing instructions to navigate the automated vehicle comprises vehicle-directing instructions to execute navigational directions.

7. The non-transitory computer-readable medium of claim 1,
   wherein the vehicle-directing instructions to stop the automated vehicle comprises vehicle-directing instructions to park the automated vehicle at the intermediary point, and
   further wherein the intermediary point is an identified legal parking space.

8. The non-transitory computer-readable medium of claim 1, wherein the traffic condition includes approaching, within a preset time range, the predetermined time at which arrival at the destination is intended.

9. The non-transitory computer-readable medium of claim 1,
   wherein the vehicle-directing instructions to stop the automated vehicle comprises vehicle-directing instructions to bring the automated vehicle to a complete stop at the intermediary point, and
   further wherein the intermediary point is a point on a road that intersects with the identified road.

10. The non-transitory computer-readable medium of claim 1, wherein the traffic condition includes at least a specific number of cars being detected as present within a specific distance proximate to the intermediary point.

11. The non-transitory computer-readable medium of claim 1, wherein the vehicle-directing instructions to navigate the automated vehicle towards the destination includes vehicle-directing instructions to navigate the automated vehicle to another intermediary point on the identified road.

12. The non-transitory computer-readable medium of claim 1, wherein the vehicle-directing instructions to navigate the automated vehicle towards the destination includes vehicle-directing instructions to navigate the automated vehicle to another intermediary point on a road other than the identified road.

13. A navigation system for an automated vehicle, the navigation system comprising:
   a traffic data interface configured to receive, at regular time intervals, traffic information within a predetermined radius of a final destination for the automated vehicle;
   a traffic detector configured to detect vehicles adjacent to the automated vehicle; and
   a navigator configured to:
      identify a temporary stopping point for the automated vehicle within the predetermined radius of the final destination based on the traffic information received by the traffic data interface,
      navigate the automated vehicle to the identified temporary stopping point,
      stop the automated vehicle at the identified temporary stopping point until a traffic condition is met between the temporary stopping point and the final destination, and
      navigate the automated vehicle away from the identified temporary stopping point responsive to the traffic condition being met.

14. The navigation system of claim 13, wherein the traffic data interface is configured to receive the traffic information via a social network.

15. The navigation system of claim 13, wherein the traffic data interface is configured to receive, via a short-range communication protocol, the traffic information from other automated vehicles located within the predetermined radius of the final destination.

16. The navigation system of claim 13, wherein the temporary stopping point is a legal parking space.

17. The navigation system of claim 13, wherein the traffic condition includes approaching, within a preset number of minutes, an appointed time at which the automated vehicle is scheduled to be at the final destination.

18. The navigation system of claim 13, wherein the temporary stopping point is in a traffic lane.

19. The navigation system of claim 13, wherein the traffic condition includes detection, by the traffic detector, of another vehicle impeded by the automated vehicle that is stopped in a traffic lane.

20. A computer-implemented method performed at a client device to reduce traffic using one or more processors, the one or more processors being configured to execute instructions stored in a memory of the client device, the computer-implemented method comprising:
   obtaining, by a traffic detector, navigation data that indicates traffic information related to a number of vehicles adjacent to an automated vehicle, wherein obtaining the navigation data comprises obtaining data from one or more of a navigational satellite, a radar detector device, a sonar detector device, and a video capturing device;

in response to an indication that the number of vehicles adjacent to the automated vehicle exceeds a particular threshold level:

locating, by a navigator, an available remote location within a predetermined distance of a particular destination for the automated vehicle;

socializing to identify an identity of the available remote location; and minimizing traffic disruptions at the available remote location, wherein minimizing includes instructing another vehicle located at the available remote location to leave the available remote location when traffic volume at the available remote location rises to a predetermined threshold level.

21. The computer-implemented method of claim 20, wherein the locating includes receiving traffic information from vehicles located within the predetermined distance of the particular destination.

22. The computer-implemented method of claim 20, wherein the socializing includes identifying the available remote location via a social network.

23. The computer-implemented method of claim 20, wherein the socializing includes transmitting an identification of the available remote location using a short-range communication protocol.

\* \* \* \* \*

UNITED STATES PATENT AND TRADEMARK OFFICE
CERTIFICATE OF CORRECTION

PATENT NO.        : 9,858,811 B2
APPLICATION NO.   : 14/518144
DATED             : January 2, 2018
INVENTOR(S)       : Ur et al.

It is certified that error appears in the above-identified patent and that said Letters Patent is hereby corrected as shown below:

In the Drawings

Delete Fig. 5 and replace with attached Fig. 5.

In the Specification

In Column 4, Line 56, delete "in to the" and insert -- into the --, therefor.

In Column 5, Line 33, delete "may located" and insert -- may be located --, therefor.

In Column 6, Line 57, delete "detector 205" and insert -- detector 215 --, therefor.

In Column 7, Line 11, delete "detector 210" and insert -- detector 215 --, therefor.

In Column 7, Line 16, delete "and/or or" and insert -- and/or --, therefor.

In Column 9, Line 5, delete "Traffic Near" and insert -- Traffic Volume Near --, therefor.

In Column 9, Line 33, delete "detector 205" and insert -- detector 215 --, therefor.

In Column 10, Line 5, delete "120, 125, and 135" and insert -- 120, 125, and 130 --, therefor.

In Column 10, Line 12, delete "may located" and insert -- may be located --, therefor.

In Column 11, Line 7, delete "one more" and insert -- one or more --, therefor.

In Column 11, Lines 13-14, delete "implementations memory" and insert -- implementations, memory --, therefor.

In Column 12, Line 29, delete "radio frequency (RE)," and insert -- radio frequency (RF), --, therefor.

Signed and Sealed this
Eighth Day of May, 2018

Andrei Iancu
*Director of the United States Patent and Trademark Office*

CERTIFICATE OF CORRECTION (continued)
U.S. Pat. No. 9,858,811 B2

In Column 13, Line 16, delete "and or" and insert -- and/or --, therefor.

In Column 13, Lines 26-27, delete "hard disk drive, a CD, a DVD," and insert -- hard disk drive (HDD), a compact disk (CD), a digital versatile disk (DVD), --, therefor.

In Column 13, Line 30, delete "wired communications link," and insert -- wired communication link, --, therefor.

In Column 14, Line 28, delete "recitation no" and insert -- recitation, no --, therefor.

In Column 14, Line 31, delete "at least one and one or more" and insert -- "at least one" and "one or more" --, therefor.

In Column 14, Line 34, delete "or an limits" and insert -- or "an" limits --, therefor.

In Column 14, Lines 37-38, delete "one or more or at least one" and insert -- "one or more" or "at least one" --, therefor.

In Column 14, Line 49, delete "general such" and insert -- general, such --, therefor.

In Column 14, Line 57, delete "general such" and insert -- general, such --, therefor.